Patented Mar. 21, 1944

2,344,918

UNITED STATES PATENT OFFICE 2,344,918

PROCESS OF PLASTICIZING ESTERS OF METHACRYLIC ACID

William S. Johnson, Philadelphia, Pa., assignor to Röhm & Haas Company, Philadelphia, Pa., a corporation of Delaware No Drawing. Application December 19, 1939, Serial No. 309,959

15 Claims. (Cl. 260—36)

This invention relates to a process for rendering acrylic and methacrylic resins permanently plastic and to the products obtained thereby.

It is known that acrylic and methacrylic acids and their functional derivatives such as the esters, nitriles, amides, etc., polymerize to transparent colorless resins which have found wide application in various industries. It has been proposed to use these resins in the preparation of molded articles, as the intermediate layer in shatterproof glass, as glass substitutes, and for many other purposes. One of the principal disadvantages of these polymers, particularly for the manufacture of shaped articles, is that they are more or less elastic so that, when the finished article is heated, it has a pronounced tendency to deform. This is particularly true of the hard, rigid polymers such as methyl methacrylate which may be shaped by pressing or blowing at a somewhat elevated temperature and cooled while in the desired shape. If such shaped articles are subsequently exposed to high temperatures, they revert to practically their original form. This property prevents such materials from being calendered into sheets and hinders them from being molded by the extrusion or injection methods.

Heretofore it has been possible to eliminate this property of the polymer only by the addition of relatively large amounts of plasticizers such as tricresyl phosphate, dibutyl phthalate, etc., but the amount of such plasticizer was usually so great that other desirable properties such as hardness and strength were substantially diminished.

It is an object of this invention to eliminate this difficulty and to provide a process whereby polymers of the acrylic and methacrylic type can be rendered permanently plastic without the addition of any plasticizer.

The terms "elastic" and "plastic" are used herein in their scientific sense to denote the behavior of the polymers when softened by heat. An elastic polymer on being heated will revert to the form it had when first polymerized or which it had before being distorted. A plastic polymer, on the other hand, shows no such tendency and will retain its shape when heated unless subjected to external forces of sufficient magnitude to distort it. An elastic material cannot be calendered into sheets or extruded for the reason that, immediately after leaving the calender rolls or the extrusion nozzle and before cooling, the elastic forces within the material cause it to resume its original shape to a greater or less extent. A plastic material, since it has no elastic properties, may be calendered or extruded into any desired shape.

It has been found that, if a polymeric substance such as methyl methacrylate is masticated on a rubber mill at temperatures of about 100 to 160° C. in the presence of small amounts of sulfur, it loses all of its elastic properties and becomes permanently plastic. It has further been found that if small amounts of ammonium dithiocarbamate, substituted ammonium dithiocarbamates or their oxidation products such as the thiuram sulfides are also added to the polymer, the plastic state can be attained with much smaller amounts of sulfur. It is immaterial how the sulfur and the dithiocarbamate are added to the polymeric material. They can be added to the monomer or to the finished polymer. In the former case it is necessary to use rather more polymerization accelerator, benzoyl peroxide for example, because of the retarding effect of sulfur. Simply polymerizing the material in the presence of the sulfur and dithiocarbamate causes some reduction in the elastic properties but, in order to eliminate them practically entirely, it is necessary to work the material on hot rolls for a few minutes. Polymeric material which has been prepared in the usual manner can be rendered plastic by milling it hot and adding sulfur or sulfur and dithiocarbamate to the batch on the mill. The effect of adding these substances in this manner is apparent within a very short time. When ordinary polymeric methyl methacrylate is milled, it forms a rough sheet which shrinks and becomes thicker when cut from the roll. As soon as the sulfur and dithiocarbamate are added, the sheet on the roll begins to become smoother and, after a few minutes, can be cut off as a perfectly smooth, non-elastic sheet. The material made by polymerizing in the presence of the sulfur and dithiocarbamate behaves in exactly the same way on the hot mill.

The amount of sulfur used determines to some degree the extent to which the elastic properties are eliminated. In the case of polymers made in the ordinary way, a very marked effect is obtained by milling them with 1% of sulfur alone, and amounts up to 5% give increased effects. However, the larger amounts are undesirable as the sulfur tends to color the product and impart an odor to it. When the dithiocarbamate is also added, the amount of sulfur required to attain the same effect is only about one-tenth as much as when the dithiocarbamate is absent. Thus, 0.1 to 0.5% of sulfur is sufficient to eliminate the elastic effects when the dithiocarbamate is present but amounts up to 3% can be employed. The amount of sulfur required is still less when the material is polymerized in the presence of the sulfur and dithiocarbamate and then masticated on a hot mill. Under these circumstances 0.05% or less of sulfur can be used to achieve the desired result.

The amount of dithiocarbamate required to bring about the desired change is small and varies between about 0.005% and 0.75% of the weight of the polymer. Larger amounts, up to about 2%, may be used but there is not much advantage in so doing.

While this method is particularly applicable to the preparation of molding powders, for press and injection molding, the reduction of the elastic properties obtained by simply polymerizing the material in the presence of the sulfur and the dithiocarbamate is of importance in the manufacture of curved sheets from sheets of polymer by a process such as is disclosed in U. S. Patent No. 2,142,445 of January 3, 1939. According to this process, sheets of polymethyl methacrylate are heated, blown into appropriate molds and cooled. The use of sheets polymerized in the presence of the sulfur and dithiocarbamate practically eliminates any tendency of such curved sheets to resume their original form on subsequent heating.

Examples of the dithiocarbamates which may be employed in the present invention are ammonium dithiocarbamate, dimethylammonium dimethyldithiocarbamate, diethylammonium diethyldithiocarbamate, piperidinium pentamethylenedithiocarbamate and their oxidation products, the thiuram sulfides, for example, tetramethyl thiuram disulfide or monosulfide.

The process is applicable to the polymers obtained from acrylic and methacrylic acids and their functional derivatives such as the esters, amides, nitriles, salts, chlorides, etc. It is particularly applicable to the lower alkyl esters such as methyl or ethyl esters of acrylic or methacrylic acid. It is also applicable to interpolymers of two or more acrylic or methacrylic compounds and to interpolymers which contain other polymerizable materials such as the vinyl esters, ethers, and acetals and styrene.

When practicing the invention by incorporating sulfur and ammonium dithiocarbamate or any of its derivatives enumerated above in the monomeric material, the polymerization is carried out in any of the usual ways, with or without catalyst, by the action of heat or light. The monomeric material may be polymerized as such or it may be dissolved in a suitable liquid and subjected to polymerizing influences or it may be dispersed in a non-solvent and polymerized in the dispersed state. These various methods of polymerization are well known and no departure from the usual manner of carrying them out is required in practicing the present invention.

When a polymer prepared in the usual way is to be plasticized by masticating it on heated rolls with the sulfur and dithiocarbamate, it is best to mix the sulfur, ammonium dithiocarbamate and some of the polymer in powder or solution form and add this to the polymer while it is being milled. After masticating for a few minutes on rolls heated internally by steam at about 50 pounds pressure, about 150° C., the polymer may be removed and then calendered, extruded or worked up in any desired manner.

The invention may be illustrated by the following examples but it is not limited to the exact materials, times, temperatures, etc. shown as it may otherwise be practiced within the scope of the appended claims.

Example 1

Methyl methacrylate containing about 0.025% of sulfur, 0.25% of ammonium dithiocarbamate and 0.5% of benzoyl peroxide is heated to about 80° C. until completely polymerized. It is then milled on heated rolls and calendered into a sheet. The sheet is perfectly smooth and does not exhibit any elastic properties on being reheated. The ammonium dithiocarbamate is prepared in situ by adding about 0.76 g. of carbon bisulfide and 0.34 g. of dry ammonia to 400 grams of monomeric methyl methacrylate. The resulting polymer is clear and colorless and most of the ammonium dithiocarbamate is decomposed and evaporated during the milling or calendering. Conventional plasticizers may be added if desired.

Example 2

0.5% of dimethyl ammonium dimethyl dithiocarbamate and 0.1% of sulfur are dissolved in monomeric methyl methacrylate containing 0.5% of benzoyl peroxide and the solution heated to about 80° C. until polymerization is complete. The resulting polymer can be milled and calendered or it may be reduced to a powder suitable for press or injection molding.

Example 3

A mixture of equal parts by weight of powdered polymeric methyl methacrylate, sulfur and powdered piperidinium pentamethylene dithiocarbamate is prepared. 1000 grams of polymeric methyl methacrylate is placed on a hot mill and milled until it becomes soft and adheres to the roll. It does not form a smooth sheet. Five grams of the mixture of powdered methyl methacrylate, sulfur and the dithiocarbamate is then added on the mill and within approximately two minutes the methyl methacrylate polymer forms a smooth sheet which can be easily removed from the rolls.

Example 4

Monomeric methyl methacrylate containing 0.2% of sulfur and 0.5% of benzoyl peroxide is heated to about 80° C. until polymerization is complete. It is then placed on a hot mill and milled until a smooth sheet is formed which usually requires about five or six minutes.

Example 5

Polymeric methyl methacrylate is placed on a hot mill and milled until it is softened. The sheet thus formed is not smooth. 0.5% by weight of sulfur is then added to the batch and after about four or five minutes further milling the sheet becomes smooth and, when cut from the mill, exhibits no elastic properties.

The products obtained according to the present invention can be mixed with pigments, dyes, and plasticizers if desired.

I claim:

1. The process of preparing permanently plastic resinous polymers of compounds of the group consisting of acrylic and methacrylic acids, acrylonitrile, methacrylonitrile and esters of acrylic and methacrylic acids with saturated alcohols which comprises masticating the polymeric material at temperatures of from about 100° C. to about 160° C. in the presence of less than 3% of sulfur and less than 2% of dimethyl ammonium dimethyl dithiocarbamate.

2. The process of preparing permanently plastic resinous polymers of compounds of the group consisting of acrylic and methacrylic acids, acrylonitrile, methacrylonitrile and esters of acrylic and methacrylic acids with saturated alcohols which comprises masticating the polymeric material at temperatures of from about 100° C. to about 160° C. in the presence of less than about 3% of sulfur and less than about 2% of an ammonium dithiocarbamate.

3. The process of preparing permanently plastic resinous polymers of compounds of the group consisting of acrylic and methacrylic acids, acrylonitrile, methacrylonitrile and esters of acrylic and methacrylic acids with saturated alcohols which comprises masticating the polymeric material at temperatures of from about 100° C. to about 160° C. in the presence of 0.02 to about 1.0% of sulfur and 0.005 to about 0.50% of dimethylammonium dimethyl dithiocarbamate.

4. The process of preparing permanently plastic resinous polymeric methyl methacrylate which comprises masticating polymeric methyl methacrylate at temperatures of from about 100° C. to about 160° C. in the presence of 0.02 to about 1.0% of sulfur and 0.005 to 0.50% of an ammonium dithiocarbamate.

5. The process of preparing permanently plastic resinous polymeric methyl methacrylate which comprises masticating polymeric methyl methacrylate at temperatures of from about 100° C. to about 160° C. in the presence of 0.02 to about 1.0% of sulfur and 0.005 to 0.50% of ammonium dithiocarbamate.

6. The process of preparing permanently plastic resinous polymers of compounds of the group consisting of acrylic and methacrylic acids, acrylonitrile, methacrylonitrile and esters of acrylic and methacrylic acids with saturated alcohols which comprises polymerizing said compound in the presence of less than 3% of sulfur and less than 2% of ammonium dithiocarbamate and masticating the resulting polymer at temperatures of from about 100° C. to about 160° C.

7. The process of preparing permanently plastic resinous polymers of compounds of the group consisting of acrylic and methacrylic acids, acrylonitrile, methacrylonitrile and esters of acrylic and methacrylic acids with saturated alcohols which comprises adding less than about 2% of sulfur and sufficient carbon bisulfide and dry ammonia to form less than about 2% by weight of ammonium dithiocarbamate calculated on the weight of the monomer to a monomeric compound of the group aforesaid, subjecting the monomer to polymerizing influences and masticating the resulting polymer at temperatures of from about 100° C. to about 160° C.

8. The process of preparing permanently plastic resinous polymeric methyl methacrylate which comprises polymerizing methyl methacrylate in the presence of less than 3% of sulfur and less than 2% of ammonium dithiocarbamate and masticating the resulting polymer at temperatures of from about 100° C. to about 160° C.

9. The process of preparing permanently plastic resinous polymeric methyl methacrylate which comprises adding 0.02 to 1.0% of sulfur and sufficient carbon bisulfide and dry ammonia to form from 0.005 to 0.50% of ammonium dithiocarbamate calculated on the weight of the methyl methacrylate to monomeric methyl methacrylate, subjecting the resulting solution to polymerizing influences and masticating the resulting polymer at temperatures of from about 100° C. to about 160° C.

10. The process of preparing permanently plastic resinous polymeric methyl methacrylate which comprises adding 0.02 to 1.0% of sulfur and from 0.005 to 0.50% of dimethylammonium dimethyldithiocarbamate calculated on the weight of the methyl methacrylate to monomeric methyl methacrylate, subjecting the resulting solution to polymerizing influences and masticating the resulting polymer at temperatures of from about 100° C. to about 160° C.

11. In the process of preparing permanently plastic resinous polymers of compounds of the group consisting of acrylic and methacrylic acids, acrylonitrile, methacrylonitrile and esters of acrylic and methacrylic acids with saturated alcohols the step which comprises polymerizing the monomeric compound in the presence of less than 3% of sulfur and less than 2% of an ammonium dithiocarbamate.

12. In the process of preparing permanently plastic resinous polymers of compounds of the group consisting of acrylic and methacrylic acids, acrylonitrile, methacrylonitrile and esters of acrylic and methacrylic acids with saturated alcohols the step which comprises polymerizing the monomeric compound in the presence of from 0.02 to about 1.0% of sulfur and from 0.005 to about 0.50% of ammonium dithiocarbamate.

13. In the process of preparing permanently plastic resinous polymers of compounds of the group consisting of acrylic and methacrylic acids, acrylonitrile, methacrylonitrile and esters of acrylic and methacrylic acids with saturated alcohols the step which comprises polymerizing the monomeric compound in the presence of from 0.02 to about 1.0% of sulfur and from 0.005 to about 0.50% of dimethylammonium dimethyl dithiocarbamate.

14. As a new article of manufacture, a permanently plastic resinous polymer of the group consisting of acrylic and methacrylic acids, acrylonitrile, methacrylonitrile and esters of acrylic and methacrylic acids with saturated alcohols containing from about 0.02 to about 1.0% of sulfur and from about 0.005 to about 0.50% of an ammonium dithiocarbamate.

15. As a new article of manufacture, a permanently plastic resinous polymeric methyl methacrylate containing from about 0.02 to about 1.0% of sulfur and from about 0.005 to about 0.50% of an ammonium dithiocarbamate.

WILLIAM S. JOHNSON.